US010515621B2

(12) United States Patent
Sung et al.

(10) Patent No.: US 10,515,621 B2
(45) Date of Patent: Dec. 24, 2019

(54) VEHICLE, METHOD FOR CONTROLLING THE VEHICLE, AND AUDIO DEVICE FOR VEHICLE

(71) Applicants: Hyundai Motor Company, Seoul (KR); Kia Motors Corporation, Seoul (KR)

(72) Inventors: Jihoon Sung, Seoul (KR); Jang Soon Han, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 4 days.

(21) Appl. No.: 15/796,486

(22) Filed: Oct. 27, 2017

(65) Prior Publication Data

US 2018/0374468 A1    Dec. 27, 2018

(30) Foreign Application Priority Data

Jun. 23, 2017    (KR) .................. 10-2017-0079656

(51) Int. Cl.
*G10K 11/178* (2006.01)
*B60Q 5/00* (2006.01)

(52) U.S. Cl.
CPC .............. *G10K 11/178* (2013.01); *B60Q 5/00* (2013.01); *G10K 11/17881* (2018.01); *B60Y 2306/09* (2013.01); *G10K 2210/1282* (2013.01); *G10K 2210/12821* (2013.01); *G10K 2210/3033* (2013.01); *G10K 2210/509* (2013.01)

(58) Field of Classification Search
CPC ............ G10K 11/178; G10K 11/1784; G10K 2210/1282; G10K 2210/12821; G10K 2210/3033; G10K 2210/509; B60Q 5/00; B60Y 2306/09
See application file for complete search history.

(56) References Cited

U.S. PATENT DOCUMENTS

| 2013/0165137 A1* | 6/2013 | Fong ...................... G01S 19/16 455/456.1 |
| 2014/0200756 A1* | 7/2014 | Sisk .................... B60L 11/1864 701/22 |

(Continued)

FOREIGN PATENT DOCUMENTS

| JP | 2014-206585 | 10/2014 |
| KR | 10-2011-0123339 | 11/2011 |

(Continued)

*Primary Examiner* — Sonia L Gay
(74) *Attorney, Agent, or Firm* — Mintz Levin Cohn Ferris Glovsky and Popeo, P.C.; Peter F. Corless

(57) ABSTRACT

A vehicle having a plurality of electronic components includes: a communicator configured to receive communicated signals from the plurality of electronic components, at least one electronic component of the plurality of electronic components outputting noise; a storage configured to store noise-related information of the plurality of electronic components; a speaker configured to output sound; and a controller configured to produce an antiphased sound signal to the noise output from the at least one electronic component based on the noise-related information stored in the storage when the at least one electronic component is operating, and control the speaker to output a sound corresponding to the antiphased sound signal.

16 Claims, 10 Drawing Sheets

(56) References Cited

U.S. PATENT DOCUMENTS

| | | | |
|---|---|---|---|
| 2014/0313047 A1* | 10/2014 | Kang | F25D 23/12 |
| | | | 340/692 |
| 2015/0060192 A1* | 3/2015 | Wink | F01N 13/08 |
| | | | 181/245 |
| 2015/0104030 A1* | 4/2015 | Ueno | G10K 11/178 |
| | | | 381/71.4 |
| 2016/0284333 A1* | 9/2016 | Weston | G10K 11/1782 |
| 2017/0026764 A1* | 1/2017 | Rajendran | H04R 1/1083 |
| 2019/0088247 A1* | 3/2019 | True | G10K 11/178 |

FOREIGN PATENT DOCUMENTS

| | | |
|---|---|---|
| KR | 10-2013-0004714 | 1/2013 |
| KR | 10-1557228 | 10/2015 |
| KR | 10-1579534 | 12/2015 |
| KR | 10-2016-0119708 | 10/2016 |

\* cited by examiner

FIG. 7

| ELECTRIC PART (310) | OPERATION START SIGNAL(320) | OPERATION STATE SIGNAL(330) | NOISE FREQUENCY INFORMATION(340) | NOISE MAGNITUDE INFORMATION(350) | NOISE FLUCTUATION INFORMATION(360) |
|---|---|---|---|---|---|
| HVAC | ACTIVATE BLOWER FAN | LEVER 1 | 5 KHz | 0.2 V | ±0.5 % |
| HVAC | ACTIVATE BLOWER FAN | LEVER 2 | 7 KHz | 0.4 V | ±1 % |
| REAR CAMERA | VEHICLE REVERSING | – | 12 KHz | 0.7 V | ±2.2 % |
| HEAD LAMP | HEADLAMP TURNED ON | – | 4.8 KHz | 0.24 V | ±2 % |
| ... | | | | | |

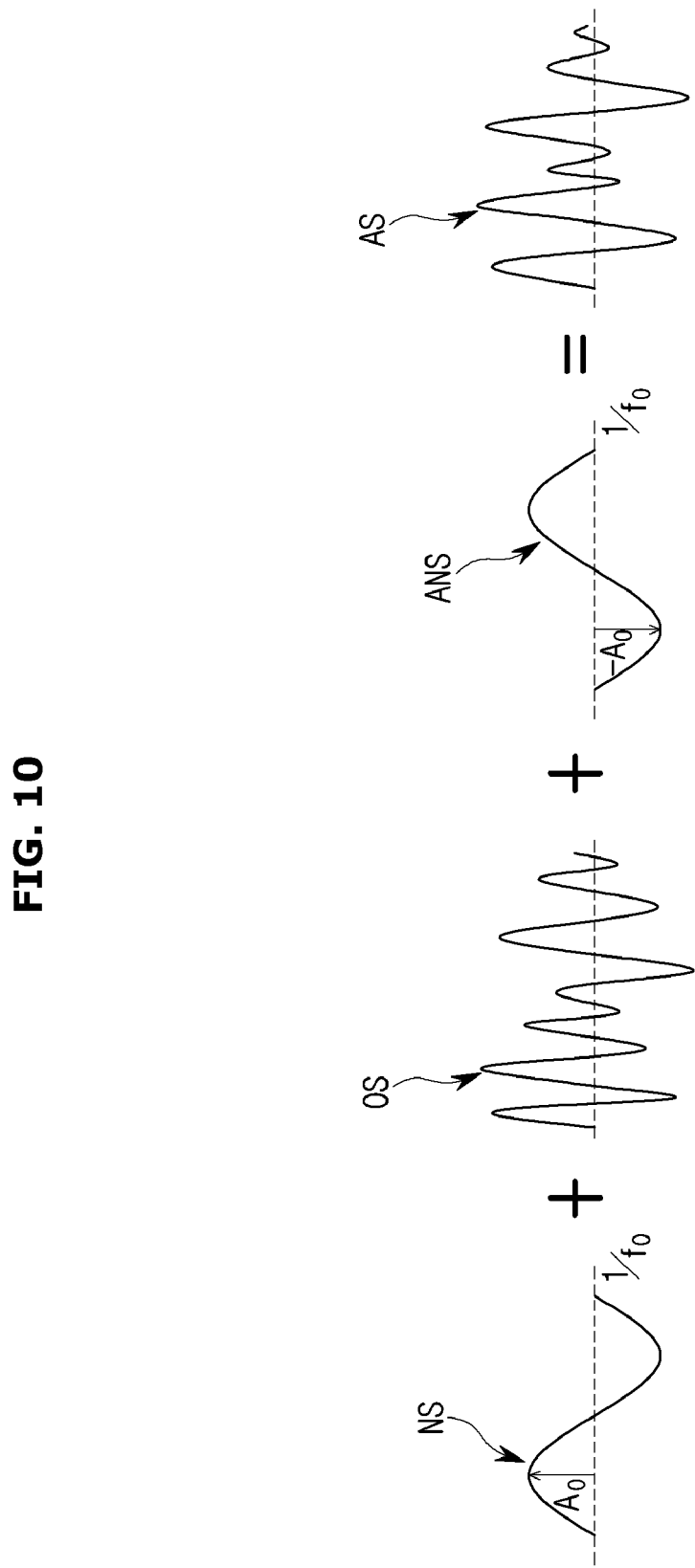

VEHICLE, METHOD FOR CONTROLLING THE VEHICLE, AND AUDIO DEVICE FOR VEHICLE

CROSS-REFERENCE TO RELATED APPLICATION

This application claims the benefit of priority to Korean Patent Application No. 10-2017-0079656, filed on Jun. 23, 2017, the disclosure of which is incorporated herein by reference in its entirety.

BACKGROUND

1. Technical Field

The present disclosure relates to vehicular technologies, and more particularly, to a vehicle, a method for controlling the vehicle, and an audio device for vehicle capable of noise blocking.

2. Discussion of Related Art

Modern-day vehicles are equipped with various car audio systems. Due to noise from inside or outside of the vehicle, however, the car audio system may fail to provide optimal sound for the driver. For example, the resonance of various electronic components installed in the vehicle, including resistors, inductors, capacitors, transistors, etc., make noise difficult to predict.

Such noise from electronic components in the vehicle can be unpleasant for the driver. Often times, the noise is mixed with the sound output from the car audio system, preventing optimal sound from being provided for the driver.

SUMMARY OF THE DISCLOSURE

An aspect of the present disclosure is to provide a vehicle equipped with an audio device capable of blocking noise inside the vehicle.

Another aspect of the present disclosure is to provide a vehicle equipped with an audio device capable of selectively blocking noise generated from the vehicle.

In accordance with embodiments of the present disclosure, a vehicle having a plurality of electronic components includes: a communicator configured to receive communicated signals from the plurality of electronic components, at least one electronic component of the plurality of electronic components outputting noise; a storage configured to store noise-related information of the plurality of electronic components; a speaker configured to output sound; and a controller configured to produce an antiphased sound signal to the noise output from the at least one electronic component based on the noise-related information stored in the storage when the at least one electronic component is operating, and control the speaker to output a sound corresponding to the antiphased sound signal.

The noise-related information may include a frequency and magnitude of noise output by each of the plurality of electronic components, respectively.

The antiphased sound signal may have the same frequency and magnitude as those of the noise output by the at least one electronic component. Further, the antiphased sound may have a phase different from the noise output by the at least one electronic component by 180 degrees.

The noise-related information may include a signal indicating a start of operation of each of the plurality of electronic components, respectively.

The controller may determine whether the at least one electronic component is operating by comparing the communicated signal received through the communicator with signals indicating a start of operation of each of the plurality of electronic components, respectively. Further, the controller may produce the antiphased sound signal based on a frequency and magnitude of noise output by the at least one electronic component that is operating.

The noise-related information may include a signal indicating a state of operation of each of the plurality of electronic components, respectively, and a frequency and magnitude of noise output by each of the plurality of electronic components, respectively, according to the corresponding state of operation.

The controller may determine a state of operation of the at least one electronic component by comparing the communicated signal received through the communicator with signals indicating a start of operation of each of the plurality of electronic components, respectively. Further, the controller may produce the antiphased sound signal based on a frequency and magnitude of noise output by the at least one electronic component having the operation state.

The vehicle may further include a microphone. The microphone may collect sound inside the vehicle. Further, the controller may adjust a magnitude of sound output through the speaker, a phase of the sound, or the magnitude and phase of the sound, based on the sound collected by the microphone.

Furthermore, in accordance with embodiments of the present disclosure, a method for controlling a vehicle equipped with a plurality of electronic components includes: receiving a communicated signal from at least one of the plurality of electronic components, at least one electronic component of the plurality of electronic components outputting noise; producing an antiphased sound signal to noise output from the at least one electronic component based on noise-related information stored in a storage when the at least one electronic component is operating; and outputting a sound corresponding to the antiphased sound signal via a speaker in the vehicle.

The noise-related information may include a frequency and magnitude of noise output by each of the plurality of electronic components, respectively.

The antiphased sound signal may have the same frequency and magnitude as those of the noise output by the at least one electronic component. Further, The antiphased sound may have a phase different from the noise output by the at least one electronic component by 180 degrees.

The noise-related information may include a signal indicating a start of operation of each of the plurality of electronic components, respectively.

The method further include determining whether the at least one electronic component is operating by comparing the received communicated signal with a start of operation of each of the plurality of electronic components, respectively.

The noise-related information may include a signal indicating a state of operation of each of the plurality of electronic components, respectively, and a frequency and magnitude of noise output by each of the plurality of electronic components, respectively, according to the corresponding state of operation.

The method further include determining a state of operation of the at least one electronic component by comparing the received communicated signal with signals indicating a start of operation of each of the plurality of electronic components, respectively. Further, the producing of the antiphased sound signal may include producing an antiphased sound signal based on a frequency and magnitude of noise output by the at least one electronic component having the operation state.

The method further include collecting sound inside the vehicle via a microphone, and adjusting a magnitude of the output sound, a phase of the output sound, or the magnitude and phase of the output sound, based on the sound collected inside the vehicle.

Furthermore, in accordance with embodiments of the present disclosure, an audio device installed in a vehicle includes: a communicator configured to receive communicated signals from a plurality of electronic components equipped in the vehicle, at least one electronic component of the plurality of electronic components outputting noise; a storage configured to store noise-related information of the plurality of electronic components; and controller configured to produce an antiphased sound signal to noise output from the at least one electronic component based on noise-related information stored in the storage when the at least one electronic component is operating, and output the antiphased sound signal via a speaker of the vehicle.

The noise-related information may include a frequency and magnitude of noise output by each of the plurality of electronic components, respectively. The antiphased sound signal may have the same frequency and magnitude as those of the noise output by the at least one electronic component, and have a phase different from the noise output by the at least one electronic component by 180 degrees.

The noise-related information may include a signal indicating whether each of the plurality of electronic components is operating. The controller may determine whether the at least one electronic component is operating by comparing the communicated signal received through the communicator with signals indicating a start of operation of each of the plurality of electronic components, respectively. Further, the controller may produce the antiphased sound signal based on a frequency and magnitude of noise output by the at least one electronic component that is operating.

The noise-related information includes a signal indicating a state of operation of each of the plurality of electronic components, respectively, and a frequency and magnitude of noise output by each of the plurality of electronic components according to the state of operation. The controller may determine a state of operation of the at least one electronic component by comparing the communicated signal received through the communicator with signals indicating a start of operation of each of the plurality of electronic components, respectively, and produce the antiphased sound signal based on a frequency and magnitude of noise output by the at least one electronic component having the operation state.

BRIEF DESCRIPTION OF THE DRAWINGS

The above and other objects, features and advantages of the present disclosure will become more apparent to those of ordinary skill in the art by describing in detail embodiments thereof with reference to the accompanying drawings, in which:

FIG. 7 shows contents of a database of a head unit included in a vehicle, according to embodiments of the present disclosure;

FIG. 10 shows another example of blocking noise generated in the vehicle, according to embodiments of the present disclosure.

Figure 1:
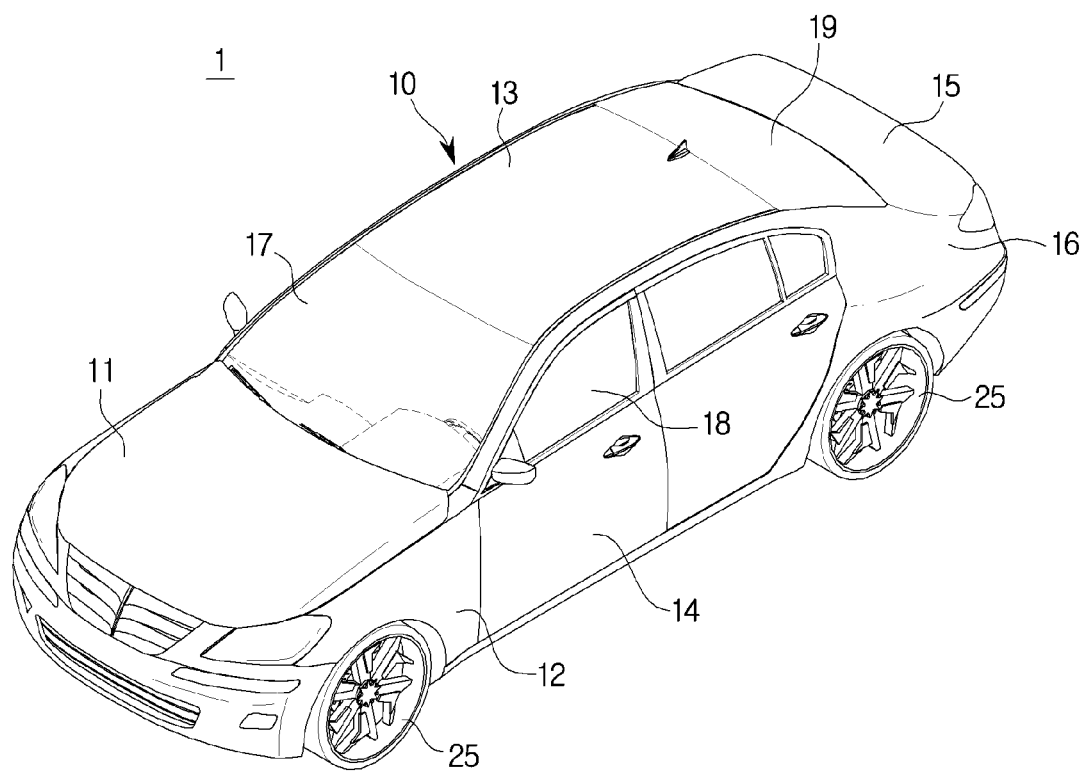
FIG. 1 shows an exterior of a vehicle, according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF EXEMPLARY EMBODIMENTS

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Reference will now be made in detail to embodiments of the present disclosure, examples of which are illustrated in the accompanying drawings, wherein like reference numerals refer to like elements throughout.

The principle and embodiments of the present disclosure will now be described with reference to accompanying drawings.

Figure 2:
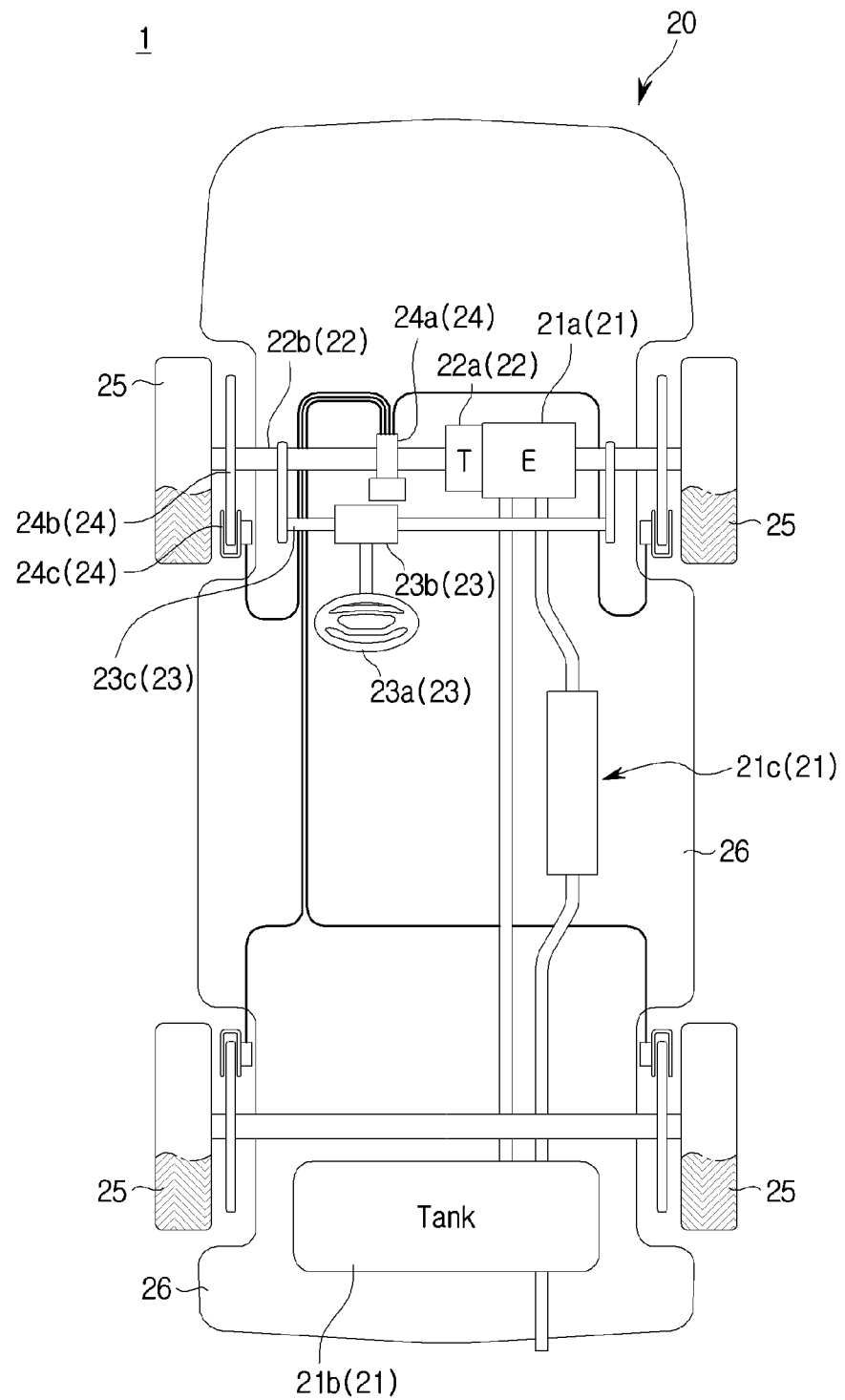
FIG. 2 shows a chassis of a vehicle, according to embodiments of the present disclosure.
Figure 3:
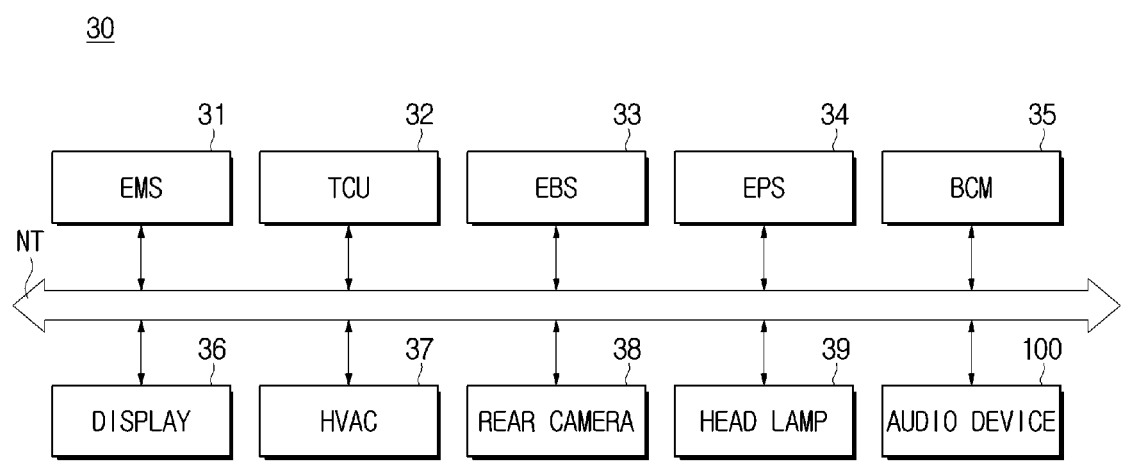
FIG. 3 shows electronic components of a vehicle, according to embodiments of the present disclosure.

FIG. 1 shows an exterior of a vehicle, according to embodiments of the present disclosure. FIG. 2 shows a chassis of a vehicle, according to embodiments of the present disclosure. FIG. 3 shows electronic components of a vehicle, according to embodiments of the present disclosure.

As shown in FIGS. 1 to 3, a vehicle 1 may include a car body 10 forming the exterior of the vehicle 1 and accommodating the driver and/or luggage, a chassis 20 including parts of the vehicle 1 other than the car body 10, and electronic components 30 for protecting the driver and giving convenience to the driver.

For example, as shown in FIG. 1, the car body 10 forms interior space, in which the driver may stay, an engine room for accommodating an engine, and a trunk room for accommodating luggage.

The car body 10 may include a hood 11, front fenders 12, a roof panel 13, doors 14, a trunk lid 15, quarter panels 16, etc. To secure a clear view for the driver, there may be a front window 17 installed on the front of the car body 10, side windows 18 installed on the sides of the car body 10, and a rear window 19 installed on the rear side of the car body 10.

For example, as shown in FIG. 2, the chassis 20 may include a power generator 21, a power deliverer 22, a steering system 23, a braking system 24, car wheels 25, etc., to help the vehicle 1 driven under the control of the driver.

The power generator 21 may generate turning force to make the vehicle 1 run under the driver's acceleration control, and include an engine 21a, a fuel supplier 21b, an exhauster 21c, an accelerator pedal 21d (e.g., see FIG. 5), etc.

The power deliverer 22 may deliver the turning force generated by the power generator 21 to the car wheels 25, and include a clutch/transmission 22a, a driving shaft 22b, a transmission lever 22c (e.g., see FIG. 5), etc.

The steering system 23 may change a traveling direction of the vehicle 1 under the control of the driver's steering control, and include a steering wheel 23a, a steering gear 23b, a steering link 23c, etc.

The braking system 24 stops traveling of the vehicle 1 under the driver's braking control, and includes a master cylinder 24a, a brake disc 24b, a brake pad 24c, a brake pedal 24d (e.g., see FIG. 5), etc.

The car wheels 25 may move the vehicle 1 by receiving the turning force from the power generator 22 through the power deliverer 21. The wheels 25 may include front wheels equipped in the front direction of the vehicle 1 and rear wheels equipped in the rear direction of the vehicle 1.

The frame 26 may have the power generator 21, power deliverer 22, steering system 23, braking system 24, and car wheels 25 fixed thereto.

The vehicle 1 may include various electronic components 30 for control of the vehicle 1 and for giving safety and comfort to the driver and passenger, as well as the aforementioned mechanical parts.

For example, as shown in FIG. 3, the vehicle 1 may include an Engine Management System (EMS) 31, a Transmission Control Unit (TCU) 32, an Electronic Braking System (EBS) 33, an Electric Power Steering device (EPS) 34, a body control module (BCM) 35, a display 36, a heating/ventilation/air conditioning device (HVAC) 37, a rear camera 38, a head lamp 39, and an audio device 100.

The EMS 31 may manage and control operation of the engine, in response to the driver's acceleration command through the accelerator pedal 21d. For example, the EMS 31 may perform engine torque control, fuel consumption control, engine failure diagnosis and/or generator control.

The TCU 32 may control operation of the transmission in response to a gearshift command from the driver through the transmission lever 22c or driving speed of the vehicle 1. For example, the TCU 32 may perform clutch control, transmission control and/or engine torque control during transmission.

The EBS 33 may control the braking system of the vehicle 1 in response to a braking command from the driver through the brake pedal 24d, and keep the vehicle 1 balanced. For example, the EBS 33 may perform operation of automatic parking brake and anti-slip during braking and/or during steering.

The EPS 34 may assist the driver to easily manipulate the steering wheel 23a. For example, the EPS 34 may assists the driver in steering manipulation by reducing steering power while the vehicle 1 is driven at low speed or is parked and increasing steering power while the vehicle 1 is driven at high speed.

The BCM 35 may provide convenience for the driver or control operation of the electronic components for securing safety of the driver. For example, the BCM 35 may control a door lock system, head lamps, a wiper, power seats, seat heaters, a cluster, a room lamp, a navigation system, a multi-functional switch, etc., which are installed in or on the vehicle 1.

The display 36 may be installed in the center fascia inside the vehicle 1, and provide an image to give various kinds of information and fun to the driver. For example, the display 36 may reproduce a video file stored in an internal or external storage medium according to a command from the driver, and output an image included in the video file. The display 36 may also receive a touch input from the driver about a destination, and display a route to the destination.

The HVAC 37 may heat or cool the inside air according to a temperature inside the vehicle 1 and a target temperature input by the driver. For example, the HVAC 37 may cool the inside air if the inside temperature is higher than the target temperature and heat the inside air if the inside temperature is lower than the target temperature.

The HVAC 37 may also introduce outside air into the vehicle 1 or block the outside air from being introduced but just circulate the air inside the vehicle 1.

The rear camera 38 may be installed on the back of the vehicle 1 to obtain a backward image behind the vehicle 1 when the vehicle 1 is reversing. The backward image obtained by the rear camera 38 may be displayed on the display 36, and the driver may check an obstacle located behind the vehicle 1 through the backward image displayed on the display 36.

The rear camera 38 may be implemented as a folding type. For example, the rear camera 38 may be folded toward the bottom of the vehicle 1 while the vehicle 1 is parking or moving, and may be unfolded to face rearward of the vehicle 1 to take the backward image while the vehicle 1 is reversing.

The headlamps 39 may be installed on the front of the vehicle 1 to direct beams forward of the vehicle 1. The headlamps 39 may be turned on according to a 'lamp on' command from the driver, or turned on if brightness around the vehicle 1 is less than a predetermined brightness level. The headlamp 39 may employ a high intensity discharge (HID) headlamp, a light emitting diode (LED) headlamp, etc.

The audio device 100 may offer various kinds of information and fun for the driver by sound. For example, the audio device 100 may play an audio file stored in an internal or external storage medium according to a command from the driver, and output sound included in the audio file. The audio device 100 may also receive audio broadcast signals, and output sound corresponding to the received audio broadcast signals.

Furthermore, the audio device 100 may block noise inside the vehicle 1. Specifically, to block the noise inside the vehicle 1, the audio device 100 may output sound with an antiphase to the noise inside the vehicle 1. For example, the audio device 100 may determine whether there is noise made by the electronic component 30 included in the vehicle 1, and output sound with an antiphase to the noise of the electronic component 30. As a result, the nose made by the electronic component 30 may be blocked by offset interference between the noise and the antiphased sound output by the audio device 100.

A structure and operation of the audio device 100 will now be described in more detail.

In addition, the vehicle 1 may further include other electronic components to protect the driver and/or provide convenience for the driver. For example, the vehicle 1 may include the electronic components 30, such as a door lock system, a wiper, power seats, seat heaters, a cluster, a room lamp, a navigation system, a multi-functional switch, etc.

The electronic components 30 may communicate to one another through a vehicle communication network (NT). For example, the electronic components 30 may exchange data over Ethernet, Media Oriented Systems Transport (MOST), Flexray, Controller Area Network (CAN), Local Interconnect Network (LIN), etc.

It should be noted that the configuration of vehicle parts and components as described above and shown in FIGS. 1 to 3 is provided merely for the purpose of demonstration and does not limit the scope of the presently defined claims.

Configuration and corresponding operation of the audio device 100 included in the vehicle 1 will now be described.

Figure 4:
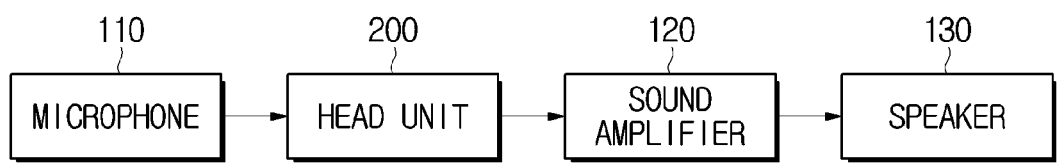
FIG. 4 is a block diagram of an audio device included in a vehicle, according to embodiments of the present disclosure.
Figure 5:
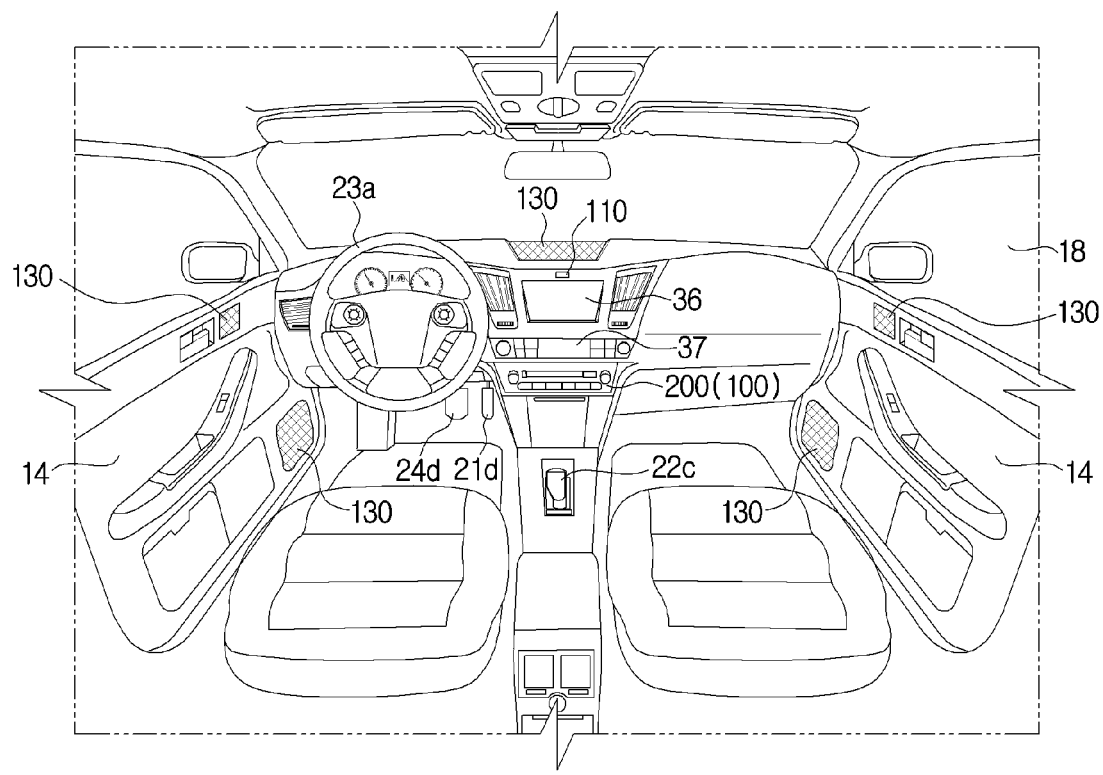
FIG. 5 shows an interior of a vehicle, according to embodiments of the present disclosure.
Figure 6:
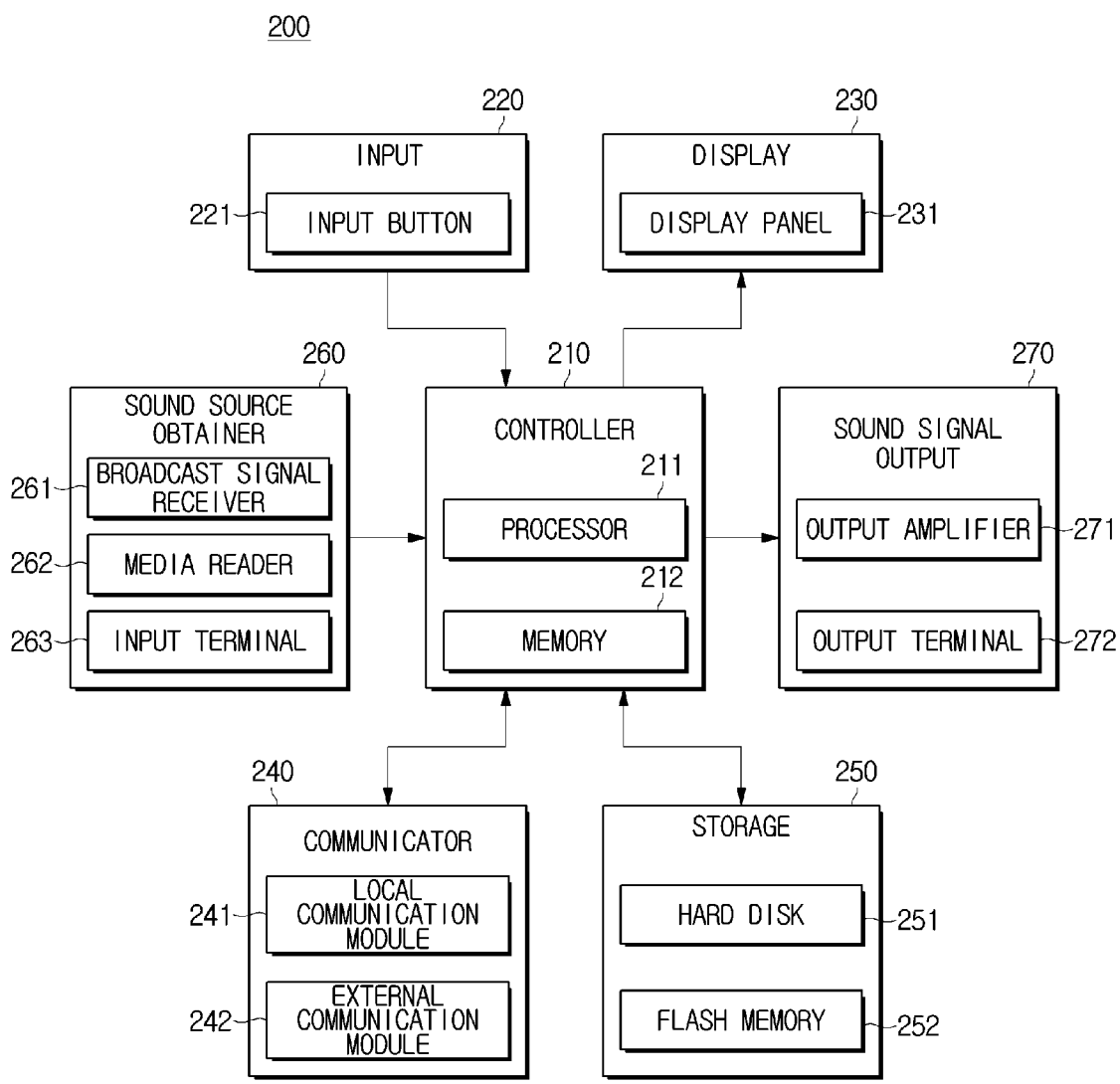
FIG. 6 is a block diagram of a head unit included in a vehicle, according to embodiments of the present disclosure.

FIG. 4 is a block diagram of an audio device included in a vehicle, according to embodiments of the present disclosure. FIG. 5 shows an interior of a vehicle, according to embodiments of the present disclosure. FIG. 6 is a block diagram of a head unit included in a vehicle, according to embodiments of the present disclosure. FIG. 7 shows contents of a database of a head unit included in a vehicle, according to embodiments of the present disclosure.

Referring first to FIG. 4, the audio device 100 may include a microphone 110 for collecting sound inside the vehicle 1, a head unit 200 for receiving commands from the driver, a sound amplifier 120 for amplifying electric sound signals, and speakers 130 for outputting sound to the interior space of the vehicle 1.

The microphone 110 may collect sound inside the vehicle 1. The sound inside the vehicle 1 may be generated inside or outside the vehicle 1, and include any sound that the driver or passenger inside the vehicle 1 may listen to. For example, the sound inside the vehicle 1 may include sound of a conversation between the driver and a passenger, sound generated from the vehicle 1, sound introduced from outside the vehicle 1, etc.

The microphone 110 may output an electric signal corresponding to the sound inside the vehicle 1 to the head unit 200.

The sound amplifier 120 may amplify the power of an electric sound signal output from the head unit 200. The sound amplifier 120 may include a vacuum tube or transistor to amplify the power of the electric signal.

The sound amplifier 120 may also distribute the electric sound signal output from the head unit 200 to the plurality of speakers 130.

In some cases, the sound amplifier 120 may be omitted. In other words, the electric sound signal output from the head unit 200 may be entered into the speakers.

The speakers 130 may convert the electric sound signal output from the sound amplifier 120 or the head unit 200 to sound, and output the sound.

The speakers 130 may be divided into various types by the frequency of the sound. For example, the speakers 130 may include a tweeter that coverts a high-frequency electric sound signal to high-frequency sound, a squawker (i.e., a midrange speaker) that converts a medium-frequency electric sound signal to medium-frequency sound, and a woofer that converts a low-frequency electric sound signal to low-frequency sound.

The speakers 130 may be installed at various positions. For example, as shown in FIG. 5, the squawker may be installed on the top side of the dashboard of the vehicle 1, and the tweeter and the woofer may be installed on the inner side of the doors 14 of the vehicle 1.

Referring next to FIG. 6, the head unit 200 may include an input 220, a display 230, a communicator 240, a storage 250, a sound source obtainer 260, a sound signal output 270, and a controller 210.

The input 220 may include a plurality of input buttons 221 to obtain commands from the driver.

The input buttons 221 may include a play button to start or pause playing a media file, a stop button to stop playing a media file, a volume button (or dial) to control output sound volume, a tune button to tune in to one of different broadcast signals of different frequencies, etc.

The input buttons 221 may further include various types of hardware devices, such as a push button, a slide button, a toggle button, a touch button, a dial, etc. The input buttons 221 may also include a Graphical User Interface (GUI), i.e., a software device, such as a touch pad.

The display 230 may include a display panel 231 to visually represent a state of operation of the audio device 100.

The display panel 231 may display a power on/off state of the audio device 100, information about a media file being played by the audio device 100, a channel (or frequency) of a tuned broadcast signal, sound volume output by the audio device 100, etc.

The display 231 may be implemented with a Cathode Ray Tube (CRT), a Digital Light Processing (DLP) panel, a Plasma Display Panel (PDP), a Liquid Crystal Display (LCD) panel, an Electro Luminescence (EL) panel, an Electrophoretic Display (EPD) panel, an Electrochromic Display (ECD) panel, a Light Emitting Diode (LED) panel, an Organic Light Emitting Diode (OLED) panel, and/or the like, but is not limited thereto.

The communicator 240 may include a local communication module 241 to communicate with internal electronic components 30 of the vehicle 1, and an external communication module 242 to communicate with external electronic devices.

The local communication module 241 may exchange data with the EMS 31, the TCU 32, the EBS 33, the EPS 34, the BCM 35, the display 36, the HVAC 36a, etc., by using a communication protocol, such as Ethernet, FlexRay, CAN, LIN, etc.

The local communication module 241 may include a transceiver to transmit and/or receive a communication signal to and/or from the NT.

The external communication module 242 may include a wireless communication module to communicate with portable computers, portable communication devices, portable media players using a communication protocol, such as WiFi, Bluetooth, etc., and a wired communication module to communicate with portable computers, portable communication devices, and portable media players using a communication protocol such as Universal Serial Bus (USB) communication.

The storage 250 may include a hard disk drive (HDD) 251, a flash memory 252, etc., for storing a program and data to control operation of the audio device 100 and reproducible media files.

The storage 250 may also store a database including information about noise made by the electronic components 30.

For example, as shown in FIG. 7, the database of nose of the electronic components 30 may include identification information 310 of the electronic components 30 that make noise, operation start information 320 indicating a start of operation of the electronic components 30, operation state information 330 indicating states of operation of the electronic components 30, frequency information 340 of noise made by the electronic components 30, magnitude information 350 of noise made by the electronic components 30, fluctuation information 360 of noise made by the electronic components 30.

The identification information 310 of the electronic components 30 may indicate identifiers to identify the electronic components 30 in the NT. For example, the identification information 310 of the electronic components 30 may include identification information of the HVAC 37, identification information of the rear camera 38, identification information of the head lamp 39, etc.

The operation start information 320 may include an operation start command entered into the electronic components 30 through the NT or information about start of operation output by the electronic components 30 through the NT. For example, the operation start information 320 may include activation of a blower fan, reversing of the vehicle 1, turning-on of the headlamp, etc.

The operation state information 330 may include information about a state of operation of the electronic components 30, which is output by the electronic components 30 over the NT. For example, the operation state information 330 may include blowing intensities (e.g., level 1, level 2, etc.) of the blower fan.

The noise frequency information 340 may include a frequency of noise made from operation of the electronic components 30. For example, the frequency information 340 may include a frequency of noise due to activation of the blower fan, a frequency of noise due to operation of the rear camera 38, a frequency of noise due to operation of the headlamp 39.

The noise magnitude information 350 may include information relating to the magnitude of noise made by operation of the electronic components 30. The noise magnitude information 350 may indicate the magnitude of noise itself, or voltage levels of the speakers 130 corresponding to the magnitude of the noise. For example, the magnitude information 350 shown in FIG. 7 represents voltage levels of speakers 130 corresponding to a magnitude of noise.

The noise fluctuation information 360 may include information relating to fluctuation in frequency and/or magnitude of noise made by operation of the electronic components 30. The noise made by the electronic components 30 may fluctuate in frequency and/or magnitude according to surrounding conditions (e.g., temperatures).

Especially, the storage 250 may store a database including information about "noise". Information about sound generated by the electronic components 300 other than the noise is not included in the database. For example, information about warning sound to be output when the driver is not wearing a seatbelt is not included in the database.

The sound source obtainer 260 may include a broadcast signal receiver 261, a media reader 262, and an input terminal 263.

The broadcast signal receiver 261 may receive broadcast signals with different frequencies and pick up a broadcast signal with a frequency selected by the driver. In other words, the broadcast signal with a frequency or channel selected by the driver is obtained and demodulated. The broadcast signal receiver 261 may include an antenna for obtaining broadcast signals with different frequencies, a tuner for tuning in to a broadcast signal with a frequency selected by the driver, and a demodulator for demodulating the broadcast signal.

The media reader 262 may read out a media file or sound data from a medium, such as a compact disc (CD), a digital versatile disc (DVD), a memory card, etc.

The audio input terminal 263 may receive electric sound signals output from, e.g., a portable computer, a portable communication device, a portable media player, etc. For example, the audio input terminal 263 may include an AUX terminal, HDMI terminal, etc.

As such, the sound source obtainer 260 may obtain a sound source from the antenna, the medium, or an external electronic device, and the obtained sound source may have various forms, such as broadcast signals, sound data, or electric sound signals.

The sound signal output 270 may include an output amplifier 271 and an output terminal 272.

The output amplifier 271 may amplify the power of an electric sound signal output through the output terminal 272. The output amplifier 271 may include a vacuum tube or transistor to amplify the power of the electric signal.

The sound output terminal 271 may output an electric sound signal corresponding to the broadcast signal, sound data, and electric sound signal obtained by the sound source obtainer 260. The sound output terminal 271 may include a high-pitched sound output terminal for outputting high-frequency sound signals, a medium-pitched sound output terminal for outputting medium-frequency sound signals, and a low-pitched sound output terminal for outputting low-frequency sound signals.

Furthermore, the sound output terminal 271 may be connected to the sound amplifier 120 or the speakers 130 directly via hardwires or over the car communication network (NT).

The controller 210 may include a memory 212 for storing a program and data for controlling operation of the head unit 200, and a processor 211 for creating instructions and data for controlling operation of the head unit 200 according to the program and data stored in the memory 212.

The processor 211 may create an electric sound signal by processing broadcast signals, sound data, or electric sound signals.

For example, the processor 211 may demodulate coded broadcast signals and/or sound data, and then create an electric sound signal.

The processor 211 may analyze a frequency spectrum of the electric sound signal, and change frequency characteristics of the electric sound signal.

The processor 211 may analyze a frequency spectrum of the electric sound signal, and produce high-frequency, medium-frequency, and low-frequency sound signals.

The processor 211 may determine whether the electronic components 30 are operating or determine a state of operation of the electronic components 30 from communicated data received through the communicator 240, and determine a frequency and magnitude of noise made by the electronic components 30 according to whether the electronic components 30 are operating or the state of operation of the electronic components 30.

The processor 211 may produce a sound signal having a phase reverse (hereinafter, also called "antiphase") to the noise made by the electronic component 30. Specifically, the processor 211 may produce an electric sound signal having the same frequency and magnitude as those of the noise of the electronic component 30 and having a phase difference of 180 degrees from the noise of the electronic component 30. The antiphased electric sound signal, that is, a sound signal having a phase reverse to the noise made by the electronic component 30, may be output to the speakers 130 through the sound signal output 270 as sound.

The processor 211 may also process the sound inside the vehicle 1 collected through the microphone 110. Specifically, the processor 211 may extract noise of the electronic component 30 from the sound inside the vehicle 1. Furthermore, the processor 211 may adjust the magnitude of the antiphased signal depending on the magnitude of the noise of the electronic component 30.

The memory 212 may store a program and data to process broadcast signals, sound data, or electric sound signals to produce an electric sound signal.

The memory 212 may include volatile memories, such as Static Random Access Memories (S-RAMs), Dynamic RAMs (D-RAMs), or the like, and non-volatile memories, such as Read Only Memories (ROMs), Erasable Programmable ROMs (EPROMs), Electrically Erasable Programmable ROMs (EEPROMs), flash memories or the like. The volatile memory may store the broadcast signal, sound data, or electric sound signal, and the non-volatile memory may store the program and data to control operation (e.g., booting operation) of the audio device 100.

As such, the controller 210 may process the broadcast signal, sound data, or electric sound signal, and produce an electric sound signal corresponding to the broadcast signal, sound data, or electric sound signal.

Furthermore, the controller 210 may determine whether the electronic components 30 are operating and/or a state of operation of the electronic components 30, and produce an electric sound signal having an antiphase to the noise made by the electronic components 30.

For example, the controller 210 may determine whether the electronic components 30 are operating and/or a state of operation of the electronic components 30, based on the database stored in the storage 250.

Once a communicated signal is received from the NT through the communicator 240, the controller 210 may identify the electronic component 30 by comparing information included in the communicated signal and the identification information 310 in the database. The controller 210 may determine whether the electronic components 30 are operating by comparing the information included in the communicated signal and the operation start information 320 in the database. Furthermore, the controller 210 may determine whether the electronic components 30 are operating by comparing the information included in the communicated signal and the operation state information 330 in the database.

The controller 210 may determine a frequency and magnitude of the noise based on the database stored in the storage 250.

Once operation of the electronic component 30 is started, the controller 210 may determine a frequency of the noise made by the electronic component 30 based on the frequency information 340 in the database. Furthermore, based on the magnitude information 350 in the database, the controller 210 may determine the magnitude of noise made by the electronic component 30 based on the magnitude information 350 in the database.

Subsequently, the controller 210 may produce an electric sound signal having the frequency and magnitude determined using the databases but having an antiphase.

Producing and outputting an electric sound signal having an antiphase to the noise of the electronic component 30 will now be described in detail.

Figure 8:
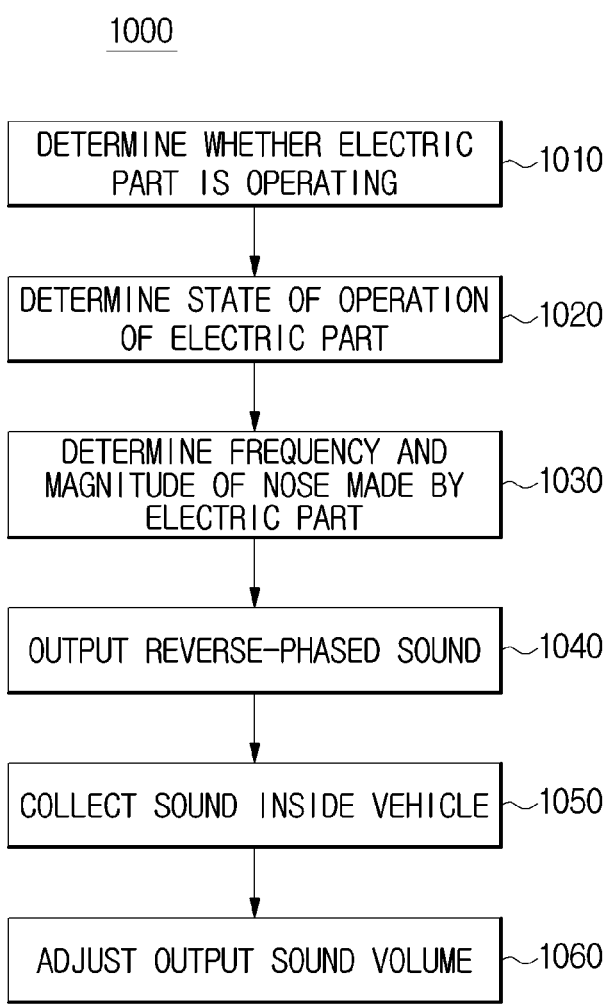
FIG. 8 is a flowchart illustrating a noise blocking method for a vehicle, according to embodiments of the present disclosure.
Figure 9:
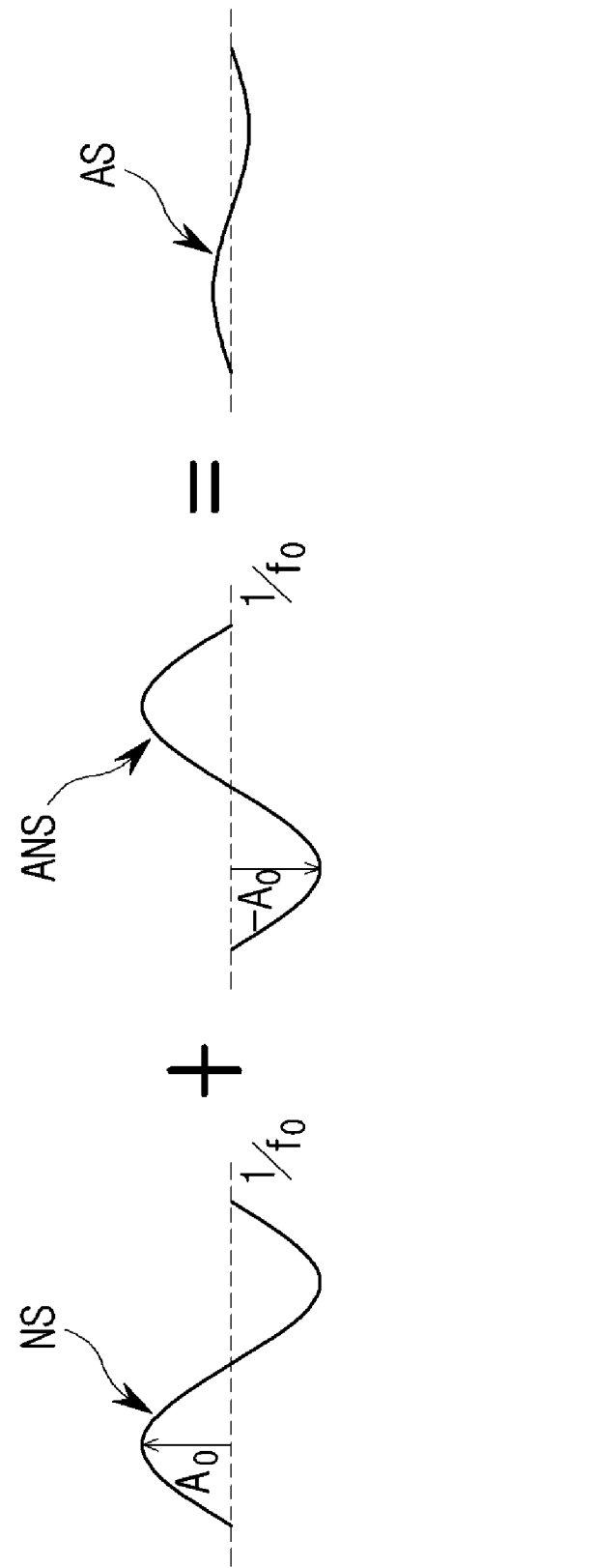
FIG. 9 shows an example of blocking noise generated in the vehicle, according to embodiments of the present disclosure.

FIG. 8 is a flowchart illustrating a noise blocking method in a vehicle, according to embodiments of the present disclosure. FIG. 9 shows an example of blocking noise generated in the vehicle, according to embodiments of the present disclosure. FIG. 10 shows another example of blocking noise generated in the vehicle, according to embodiments of the present disclosure.

A noise blocking method 1000 for the vehicle 1 will be described in connection with FIGS. 8 to 10.

The audio device 100 of the vehicle 1 determines whether the electronic components 30 are operating that make noise, in 1010.

The audio device 100 may include the storage 250 for storing a database of the noise of the electronic components 30. Furthermore, the database of the noise may include identification information 310 of the electronic components 30 that make noise, operation start information 320 indicating a start of operation of the electronic components 30, operation state information 330 indicating state of operation of the electronic components 30, frequency information 340 of noise made by the electronic components 30, magnitude information 350 of noise made by the electronic components 30, fluctuation information 360 of noise made by the electronic components 30.

The controller 210 of the audio device 100 may search the database stored in the storage 250 based on a signal received through the NT, and determine whether the electronic component 30 is operating based on the search result.

For example, when the driver turns on the HVAC 37, the HVAC 37 may activate the blower fan to circulate air inside the vehicle 1, and output a signal indicating that the HVAC 37 is turned on (hereinafter, referred to as a "turn-on signal" of the HVAC 37) through the NT. The operation of the blower fan may make noise with a particular frequency.

The controller 210 may receive the turn-on signal of the HVAC 37 through the NT, and compare the turn-on signal of the HVAC 37 with operation start signals in the database. The controller 210 may also determine whether the HVAC 37 is operating based on the result of searching the database.

In another example, if the driver puts the transmission lever 22c at a position to reverse the vehicle 1, the TCU 32 may output a signal indicating reversing of the vehicle 1 via the NT. The rear camera 38 may be unfolded toward the back direction of the vehicle 1 to take an image behind the vehicle 1 in response to the signal to reverse the vehicle 1, and the operation of changing the direction of the camera 38 may make noise with a particular frequency.

The controller 210 may receive the signal to reverse the vehicle 1 through the NT, and compare the signal to reverse the vehicle 1 with operation start signals in the database. The controller 210 may also determine whether the rear camera 38 is operating based on the result of searching the database.

In another example, if brightness around the vehicle 1 is less than a predetermined brightness level, the BCM 35 may turn on the headlamp 39 and output a signal indicating the turning-on of the headlamp 39 through the NT. The headlamp 39 is turned on in response to a turn-on command from the BCM 35, and the turning-on of the headlamp 39 may make noise with a particular frequency.

The controller 210 may receive the turn-on signal of the headlamp 39 through the NT, and compare the turn-on signal of the headlamp 39 with operation start signals in the database. The controller 210 may also determine whether the headlamp 39 is operating based on the result of searching the database.

The audio device 100 of the vehicle 1 determines whether the electronic component 30 is operating, in 1020.

The controller 210 of the audio device 100 may search the database stored in the storage 250 based on a signal received through the NT, and determine a state of operation of the electronic component 30 based on the search result.

For example, if the driver changes air volume of the HVAC 37, the HVAC 37 may change the RPM (revolution per minute) of the blower fan, and output a signal indicating a change in air volume of the HVAC 37 through the NT. The changing operation of the blower fan may change the frequency of noise.

The controller 210 may receive the air volume signal of the HVAC 37 through the NT, and compare the air volume signal of the HVAC 37 with operation state signals in the database. The controller 210 may also determine a state of operation of the HVAC 37 based on the result of searching the database.

The audio device 100 of the vehicle 1 determines a frequency and magnitude of noise made by the electronic component 30, in 1030.

The controller 210 of the audio device 100 may search the database stored in the storage 250 based on whether the electronic component 30 is operating and/or a state of operation of the electronic component 30, and determine a frequency and magnitude of the noise of the electronic component 30 based on the search result.

Specifically, by performing operations 1010 and 1020, the controller 210 may determine which one(s) is operating among the electronic components 30 and determine a state of operation of the electronic component(s) 30. Furthermore, by searching the database, the controller 210 may determine a frequency and magnitude of noise made by the operating electronic component 30.

For example, if the HVAC 37 is operating at a first level, the controller 210 may determine that noise with the frequency of 5 kHz and magnitude of 0.2 volt (V) is made. Furthermore, if the rear camera 38 is operating, the controller 210 may determine that noise with the frequency of 12 kHz and magnitude of 0.4V is made.

The audio device 100 of the vehicle 1 outputs sound with an antiphase to the noise of the electronic component 30.

The controller 210 of the audio device 210 may generate an antiphased sound signal based on the frequency and magnitude of the noise made by the operating electronic component 30. Specifically, the controller 210 may produce an antiphased sound signal having the same frequency and magnitude as those of the noise and having a phase different from the noise by 180 degrees.

For example, as shown in FIG. 9, a noise signal (NS) with frequency $f_0$ and magnitude $A_0$ may be made by the electronic component 30.

The controller 210 may produce an antiphased sound signal (ANS) with frequency $f_0$ and magnitude $A_0$, and the ANS has a difference in phase from the NS of the electronic component 30 by 180 degrees. The controller 210 may also output the ANS as sound through the speakers 130.

When the audio device 100 outputs the sound having an antiphase to the noise, the noise from the electronic component 30 may be reduced. For example, as shown in FIG. 9, when the ANS is output for the NS, offset interference may occur between the NS and the ANS. In other words, due to the ANS, the NS may be reduced, and the driver may listen to the reduced AS.

As described above, however, the database stored in the storage 250 includes information about "noise" of the electronic components 30. In other words, the database includes no information about "sound" provided by the electronic component 30 for the user. For example, the database has no information about warning sound to be output when the driver is not wearing the seat belt, so the warning sound would not be reduced.

For example, as shown in FIG. 10, an NS with frequency $f_0$ and magnitude $A_0$ may be made by the electronic component 30, and original sound (OS) may be made from a conversation between the drier and the passenger and/or music played by the audio device 100. The NS gives unpleasant feeling to the driver, but the OS may provide information and fun to the driver.

In this case, the audio device 100 may selectively block the NS that gives unpleasant feeling to the driver. Specifically, the controller 210 may determine operation of the electronic component 30, and produce the ANS with the same frequency $f_0$ and magnitude $A_0$ as the NS and a phase different from the NS by 180 degrees. The controller 210 may also output the ANS as sound through the speakers 130.

Consequently, as shown in FIG. 10, the NS of the electronic component 30 is selectively reduced by the ANS while the same sound AS as the OS is provided for the driver.

Accordingly, the driver may selectively listen to the same sound AS as the OS.

The audio device 100 of the vehicle 1 collects sound inside the vehicle, in 1050.

The audio device 100 may collect sound inside the vehicle 1 using the microphone 110. The microphone 110 may collect the sound inside the vehicle 1 and output an electric signal corresponding to the collected sound to the head unit 200.

The audio device 100 of the vehicle 1 adjusts the output magnitude of the antiphased sound, in 1060.

The audio device may adjust the output magnitude of the antiphased sound based on the sound collected by the microphone 110 inside the vehicle 1.

The head unit 200 of the audio device 100 may receive a signal about the sound inside the vehicle 1 from the microphone 110, and the controller 210 of the head unit 200 may analyze the sound inside the vehicle 1.

For example, the controller 210 may perform spectrum analysis on the sound inside the vehicle 1 and extract frequency components of the NS of the electronic component 30. Furthermore, the controller 210 may adjust the magnitude of the ANS based on the frequency components of the NS.

Specifically, the controller 210 may determine whether the NS has been blocked based on the frequency components of the NS, and increase the magnitude of the ANS if it is determined that the NS has not been blocked.

If the frequency component of the NS decreases due to the increase in the magnitude of the ANS, the controller 210 may increase the magnitude of the ANS for the frequency component of the NS to be less than a predetermined value.

On the other hand, if the frequency component of the NS increases due to the increase in the magnitude of the ANS, the controller 210 may reduce the magnitude of the ANS. Since the ANS causes noise inside the vehicle 1, the controller 210 may reduce the noise inside the vehicle 1 by reducing the magnitude of the ANS.

As described above, the audio device 100 may determine whether the electronic component 30 is operating by using internal communication of the vehicle 1, and selectively block the noise made by the electronic component 30 by outputting antiphased sound.

Furthermore, the audio device 100 may collect noise inside the vehicle 1 using the microphone 110, and properly block the noise inside the vehicle 1 by adjusting the magnitude of the antiphased sound depending on the magnitude of the collected noise.

According to embodiments of the present disclosure, provided is a vehicle equipped with an audio device capable of blocking noise inside the vehicle. Furthermore, according to embodiments of the present disclosure, provided is a vehicle equipped with an audio device capable of selectively blocking noise generated from the vehicle.

In the embodiments described above, some components may be implemented as a "module". Here, the term "module" means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

While contents of the present disclosure have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle having a plurality of electronic components, the vehicle comprising:
   a communicator configured to receive communicated signals from the plurality of electronic components;
   a storage configured to store noise-related information of the plurality of electronic components, the noise-related information including a plurality of signals corresponding to each of the plurality of electronic components, each of the plurality of signals indicating a start of operation of a corresponding electronic component;
   a microphone configured to collect a second sound inside the vehicle;
   a speaker configured to output a first sound; and
   a controller configured to select at least one electronic component of the plurality of electronic components by comparing a communicated signal received through the communicator with each of the plurality of signals indicating the start of operation of the corresponding electronic component, produce an antiphased sound signal to noise output from the selected at least one electronic component based on a frequency and magnitude of noise output by the selected at least one electronic component included in the noise-related information, control the speaker to output the first sound which corresponds to the antiphased sound signal, determine whether the noise is blocked by the first sound based on the second sound collected by the microphone after the speaker outputs the first sound, and adjust at least one of a magnitude of the first sound output through the speaker and a phase of the first sound output through the speaker based on whether the noise is blocked.

2. The vehicle of claim 1, wherein the noise-related information includes a frequency and magnitude of noise output by each of the plurality of electronic components, respectively.

3. The vehicle of claim 2, wherein the antiphased sound signal has the same frequency and magnitude as those of the noise output by the at least one electronic component, and has a phase different from the noise output by the at least one electronic component by 180 degrees.

4. The vehicle of claim 1, wherein the controller is further configured to determine whether the at least one electronic component is operating by comparing the communicated signal received through the communicator with signals indicating a start of operation of each of the plurality of electronic components, respectively, and to produce the antiphased sound signal based on a frequency and magnitude of noise output by the at least one electronic component that is operating.

5. The vehicle of claim 1, wherein the noise-related information includes a signal indicating a state of operation of each of the plurality of electronic components, respectively, and a frequency and magnitude of noise output by each of the plurality of electronic components, respectively, according to the corresponding state of operation.

6. The vehicle of claim 5, wherein the controller is further configured to determine a state of operation of the at least one electronic component by comparing the communicated signal received through the communicator with signals indicating a start of operation of each of the plurality of electronic components, respectively, and to produce the antiphased sound signal based on a frequency and magnitude of noise output by the at least one electronic component having the operation state.

7. A method for controlling a vehicle equipped with a plurality of electronic components, the method comprising:
receiving a communicated signal from at least one of the plurality of electronic components;
collecting sound inside the vehicle via a microphone in the vehicle;
selecting at least one electronic component of the plurality of electronic components by comparing a communicated signal received through the communicator with each of the plurality of signals indicating the start of operation of the corresponding electronic component;
producing an antiphased sound signal to noise output from the selected at least one electronic component based on a frequency and magnitude of noise output by the selected at least one electronic component included in noise-related information, the noise-related information including a plurality of signals corresponding to each of the plurality of electronic components, each of the plurality of signals indicating a start of operation of a corresponding electronic component;
outputting a first sound corresponding to the antiphased sound signal via a speaker in the vehicle;
determining whether the noise is blocked by the first sound based on a second sound inside the vehicle collected by a microphone after the speaker outputs the first sound; and
adjusting at least one of a magnitude of the first sound output through the speaker and a phase of the first sound output through the speaker based on whether the noise is blocked.

8. The method of claim 7, wherein the noise-related information includes a frequency and magnitude of noise output by each of the plurality of electronic components, respectively.

9. The method of claim 8, wherein the antiphased sound signal has the same frequency and magnitude as those of the noise output by the at least one electronic component, and has a phase different from the noise output by the at least one electronic component by 180 degrees.

10. The method of claim 7, further comprising:
determining whether the at least one electronic component is operating by comparing the received communicated signal with a start of operation of each of the plurality of electronic components, respectively.

11. The method of claim 7, wherein the noise-related information includes a signal indicating a state of operation of each of the plurality of electronic components, respectively, and a frequency and magnitude of noise output by each of the plurality of electronic components, respectively, according to the corresponding state of operation.

12. The method of claim 11, further comprising:
determining a state of operation of the at least one electronic component by comparing the received communicated signal with signals indicating a start of operation of each of the plurality of electronic components, respectively,
wherein the producing of the antiphased sound signal comprises producing an antiphased sound signal based on a frequency and magnitude of noise output by the at least one electronic component having the operation state.

13. An audio device installed in a vehicle, the audio device comprising:
a communicator configured to receive communicated signals from a plurality of electronic components equipped in the vehicle;
a storage configured to store noise-related information of the plurality of electronic components, the noise-related information including a plurality of signals corresponding to each of the plurality of electronic components, each of the plurality of signals indicating a start of operation of a corresponding electronic component; and
a controller configured to select at least one electronic component of the plurality of electronic components by comparing a communicated signal received through the communicator with each of the plurality of signals indicating the start of operation of the corresponding electronic component, produce an antiphased sound signal to noise output from the selected at least one electronic component based on a frequency and magnitude of noise output by the selected at least one electronic component included in noise-related information, control a speaker of the vehicle to output a first sound corresponding to the antiphased sound signal, determine whether the noise is blocked by the first sound based on a second sound inside the vehicle collected by a microphone after the speaker outputs the first sound, and adjust at least one of a magnitude of the first sound output through the speaker and a phase of the first sound output through the speaker based on whether the noise is blocked.

14. The audio device of claim 13, wherein the noise-related information includes a frequency and magnitude of noise output by each of the plurality of electronic components, respectively, and the antiphased sound signal has the same frequency and magnitude as those of the noise output by the at least one electronic component, and has a phase different from the noise output by the at least one electronic component by 180 degrees.

15. The audio device of claim 13, wherein:
the noise-related information includes a signal indicating whether each of the plurality of electronic components is operating, and
the controller is further configured to determine whether the at least one electronic component is operating by comparing the communicated signal received through the communicator with signals indicating a start of operation of each of the plurality of electronic components, respectively, and to produce the antiphased sound signal based on a frequency and magnitude of noise output by the at least one electronic component that is operating.

16. The audio device of claim 13, wherein:
the noise-related information includes a signal indicating a state of operation of each of the plurality of electronic components, respectively, and a frequency and magnitude of noise output by each of the plurality of electronic components according to the state of operation, and
the controller is further configured to determine a state of operation of the at least one electronic component by comparing the communicated signal received through the communicator with signals indicating a start of operation of each of the plurality of electronic components, respectively, and to produce the antiphased sound signal based on a frequency and magnitude of noise output by the at least one electronic component having the operation state.

* * * * *